United States Patent [19]

Mouissie

[11] Patent Number: 5,106,307
[45] Date of Patent: Apr. 21, 1992

[54] CONNECTOR ASSEMBLY, IN PARTICULAR FOR USE IN AN ELECTRICALLY ADJUSTABLE SHOCK ABSORBER

[75] Inventor: Bob Mouissie, Berlicum, Netherlands

[73] Assignee: E. I. Du Pont de Nemours and Company, Wilmington, Del.

[21] Appl. No.: 714,875

[22] Filed: Jun. 13, 1991

[30] Foreign Application Priority Data

Jun. 21, 1990 [NL] Netherlands .................. 9001426

[51] Int. Cl.$^5$ .................................. H01R 13/64
[52] U.S. Cl. ........................... 439/34; 188/299; 439/630
[58] Field of Search .............. 439/34, 680; 188/299

[56] References Cited

U.S. PATENT DOCUMENTS

| | | | |
|---|---|---|---|
| 4,576,258 | 3/1986 | Spisak et al. | 188/299 |
| 4,789,343 | 12/1988 | Dougherty et al. | 439/34 |

FOREIGN PATENT DOCUMENTS

| | | |
|---|---|---|
| 0186355 | 7/1986 | European Pat. Off. |
| 866688 | 4/1952 | Fed. Rep. of Germany |
| 3622634 | 1/1988 | Fed. Rep. of Germany |
| 620357 | 4/1927 | France |
| 2123112 | 1/1984 | United Kingdom |

Primary Examiner—Eugene F. Desmond

[57] ABSTRACT

A connector assembly, in particular for use in an electrically adjustable shock absorber of the type comprising a cylindrical housing in which shock-absorbing means and electrical control means are accommodated. The connector assembly comprises a connector having an elongated supporting element of electrically insulating material to be accommodated in the cylindrical housing. At a first end of the supporting element contact elements and positioning means, comprising an approximately T-shaped polarization lobe projecting outwards in the lengthwise direction of the supporting element, for contacting a further connector are situated. From the first end past the second end of the supporting element eletrical conductors, preferably contact tracks on a flexible film connected to the contact elements, extend for connection of the electrical control means. The further connector comprises a cap of electrically insulating material provided with further contact elements and an approximately T-shaped polarization slit for receiving the polarization lobe and for contacting the contact elements of the connector coaxially with the cylindrical housing. Locking means are provided for locking the further connector on the cylindrical housing.

14 Claims, 2 Drawing Sheets

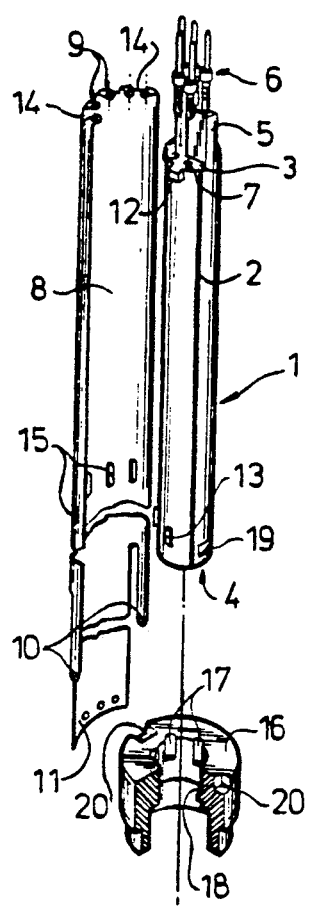
Fig. 1
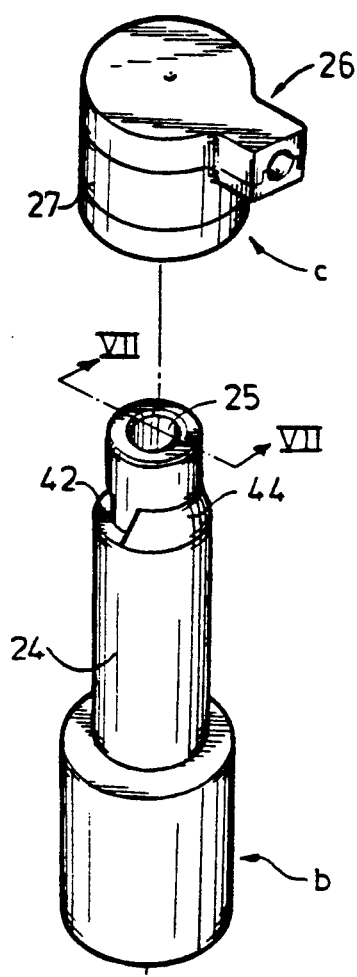
Fig. 4
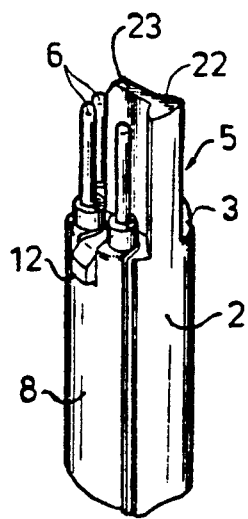
Fig. 3
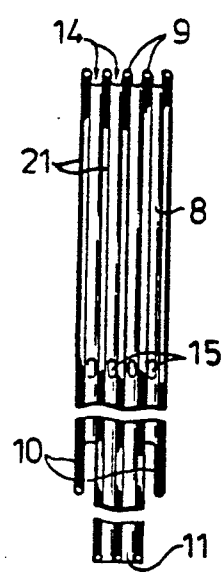
Fig. 2
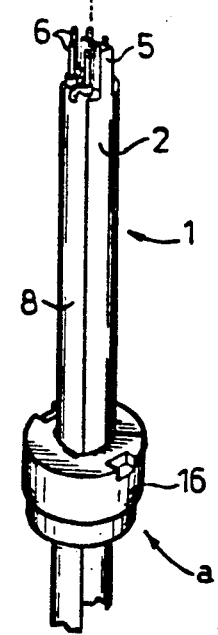

CONNECTOR ASSEMBLY, IN PARTICULAR FOR USE IN AN ELECTRICALLY ADJUSTABLE SHOCK ABSORBER

BACKGROUND OF THE INVENTION

The invention relates to a connector assembly, in particular for use in an electrically adjustable shock absorber of the type comprising a cylindrical housing in which shock-absorbing means and electrical control means are accommodated.

Electrically adjustable shock absorbers are used to make their shock-absorbing properties adaptable in the optimum manner to the circumstances of use, such as the load of a vehicle, the state of the road, the speed of the vehicle and the like. On starting off, acceleration or braking of, for example, a car it is important to maintain road-holding. For travel along a good, fairly even road surface less shock-absorbing action of the shock absorber is generally necessary than for travel along a poor, uneven road surface, where the shock absorbers have to have a strong shock-absorbing action.

The shock-absorbing means in the cylindrical housing of the shock absorber generally consist of a piston rod which is movable in the cylinder and has fastened thereto a piston provided with one or more duct systems with different shock-absorbing properties, by means of which shock-absorbing fluid can flow to spaces in the cylinder on either side of the piston. The shock-absorbing properties of the shock absorber in question can be set by varying the width of passage of the duct systems. Depending on the type of shock absorber, the electrical control means for varying the passage of the duct systems can be servomotors or stepping motors, electromagnetically operated valves and the like, and can comprise one or more sensors, for example pressure sensors, temperature sensors and the like.

Unlike these electrical control means, which are fitted in the cylindrical housing of the shock absorbers, the means for energization thereof or processing of the sensor signals are generally placed outside the shock absorber in the vehicle.

U.S. Pat. No. 4,576,258 and U.S. Pat. No. 4,789,343 disclose an electrical connector assembly for connecting the electrical control means in the housing of a shock absorber to energization means and signal processing means positioned outside the shock absorber.

Since shock absorbers are often fitted so that they are difficult to reach and are not clearly visible, it is important that the contacting of the connector in a shock absorber with a further connector can be carried out by touch. However, such forces can occur here that the contact elements are damaged, with all the adverse consequences which this entails.

SUMMARY OF THE INVENTION

The object of the invention is now to provide an improved connector assembly, comprising a connector and a further connector to be connected breakably thereto, for contacting the electrical control means from the outside of the housing of the shock absorber for connection to supply means and signal processing means, for example a microprocessor.

Accordingly, the invention provides for a connector comprising a supporting element of electrically insulating material to be accommodated in the cylindrical housing and having a first and second end, contact elements and positioning means for connecting a further connector being situated at the first end, and electrical conductors connected to the respective contact elements extending from the first end past the second end for connecting the electrical control means, wherein the positioning means comprising a polarization lobe projecting outwards past the first end in the lengthwise direction of the supporting element, for contacting the contact elements of the connector with the further connector in a specific position, the polarization lobe being situated inside the periphery of the supporting element and having an approximately T-shaped cross-section, one leg of which adjoins the periphery of the supporting element.

In the case of the connector according to the invention the danger of damaging the connector in contacting thereof is eliminated through the use of positioning means in the form of a rigid T-shaped polarization lobe projecting outside past the first end of the supporting element. This polarization lobe has a twofold function, namely the prevention of incorrect contacting, on the one hand, and the protection of the contact elements against the action of undesirable forces thereon, on the other; because the polarization lobe acts as a guide for the movement of the further connector and can absorb the forces which can be expected when the connector is contacted by touch.

An effective protection of the contact elements against undesirable force during the contacting thereof is provided in the preferred embodiment of the connector according to the invention through the contact elements being placed inside the periphery of the supporting element opposite another leg of the polarization lobe.

The polarization lobe is preferably of such dimensions that it projects further outwards past the first end in the lengthwise direction of the supporting element than the contact elements. This means that before the contact elements are contacted by a further connector this further connector is already in the required contact position.

Although the electrical conductors for the connection of electrical control means can consist of an electrical cable or seperate, insulated wires, the invention provides for a preferred embodiment which is advantageous as regards assembly, in which the supporting element is elongated in shape and the electrical conductors are electrically conducting contact tracks placed on a flexible film extending along the periphery of the supporting element.

Unlike a connector provided with electrically insulated wires, a connector built up in this way is easy to fit in the cylindrical housing of a shock absorber. In addition to the ease of assembly, the use of an electrical conductor film has the further advantage that it takes up little space, is very resistant to the high temperatures which can occur in a shock absorber and, inter alia through a suitable coating, can be made very resistant to attacks by the shock-absorbing fluid used. Flexible conductor films which are suitable for this purpose are known per se in practice.

In order to protect the flexible film as far as possible from damage, the supporting element is elongated in shape. With the same purpose, in the preferred embodiment of the invention, the supporting element near the first and second end is provided with lobes projecting radially outwards, while the film is provided with slits and/or holes corresponding to these lobes, for centring the film relative to the supporting element. During the fitting of the connector in the cylindrical housing of a shock absorber, these lobes and the corresponding slits and/or holes in the film prevent undesirable mechanical forces from being exerted on the connection between the electrically conducting contact tracks of the film and the respective contact elements of the connector.

In order to keep the flexible film fixed firmly to the supporting element, the connector according to the invention, in the preferred embodiment thereof, has a retaining ring which is to be fitted from the second end over the supporting element, for holding the film against the supporting element, which retaining ring has slits lying on the inner periphery and opening onto a boundary face, for the accommodation of the lobes lying near the second end, and is provided with at least one locking lobe projecting in the radial direction from the inner periphery, while the supporting element at the second end has at least one corresponding locking slit for the accommodation of the locking lobe. In addition to the retention of the flexible film against the supporting element, the retaining ring can also act as a stop and as a fixing element for mounting and fixing the connector in a cylindrical housing. The supporting element and the retaining ring are preferably made of plastic.

The connector according to the invention can be provided either in a housing for purposes of mounting or mounted in an open cylindrical housing, the supporting element lying with its first end near an open end in the housing in question, for contacting the contact elements of the connector with a further connector.

The connector assembly according to the invention also comprises a further connector for contacting of the connector fitted in a cylindrical housing, comprising a cap of electrically insulating material provided with further contact elements and an accommodation hole for contacting the contact elements of the connector coaxially with the cylindrical housing from the open end thereof, which further connector is provided with a polarization slit having an approximately T-shaped cross-section for receiving the polarization lobe, and with locking means for locking the further connector on the cylindrical housing in the contacted position.

In a further connector for use with the preferred embodiment of the connector the further contact elements are situated opposite the part of the polarization slit corresponding to the another leg of the polarization lobe. The polarization slit acts as a guide during the connection and disconnection of the connectors and prevents the action of lateral forces on the contact elements.

The contact elements of the connector and the further contact elements of the further connector are preferably in the form of a pin/socket combination. It will be clear that other contact element combinations suitable for breakable contacting for the coaxial contacting of connectors can be used. In order to prevent leakage of shock-absorbing fluid through the connector when fitted in a shock absorber, in a further embodiment the cap is provided with sealing means, for fitting of the further connector in a liquid-tight manner over the open end of the cylindrical housing. The sealing means are preferably in the form of an O-ring which is fitted in the cap for engaging the outer periphery of the cylindrical housing.

As already mentioned, during connection and disconnection of the connector and the further connector by touch relatively great forces can be exerted on both, which requires a reliable locking mechanism. In the preferred embodiment of the further connector according to the invention, the locking means comprise a bar which lies eccentrically relative to the centre over the accommodation hole of the cap, for engagement in a locking slit or step provided on the outer periphery of the cylindrical housing, near the open end thereof. This bar is preferably made of metal. It has been found that this locking mechanism is extremely well suited for connection of the connectors by touch and is very resistant to vibration and shocks of the type which occur in road or rail vehicles, hovercraft or aircraft.

An embodiment of the further connector which is advantageous in terms of assembly is one in which the cap is made up of a separate base part for supporting the further contact elements, the electrical conductors to be connected thereto and the sealing means, with a cover sealing the contact elements and the electrical conductors at one side of the base part and a sleeve fitted at another side of the base part for supporting the locking bar, the base part, the cover and the sleeve being made of plastic and being connected to each other in a liquid-tight manner by means of ultrasonic welding. After the interconnection of the individual parts of the cap, the empty spaces therein are preferably filled by means of an epoxy resin, so that a moisture-proof unit is obtained. The base part, the cover and the sleeve are preferably made of an impact-proof plastic.

The invention is explained in greater detail below with reference to a preferred embodiment shown in the drawing.

BRIEF DESCRIPTION OF THE DRAWING

FIG. 1 shows schematically in perspective the connector according to the invention, in exploded view, for fitting in a cylindrical housing;

FIG. 2 shows schematically, partially the flexible conductor film used in the connector according to FIG. 1;

FIG. 3 shows schematically in perspective a detail of the connector according to FIG. 1, on an enlarged scale;

FIGS. 4a, 4b and 4c show schematically in perspective and exploded view, partially the connector according to FIG. 1, a cylindrical housing and a further connector respectively;

FIG. 6b shows a variant of FIG. 6a;

DETAILED DESCRIPTION OF THE EMBODIMENT

Figure 5:
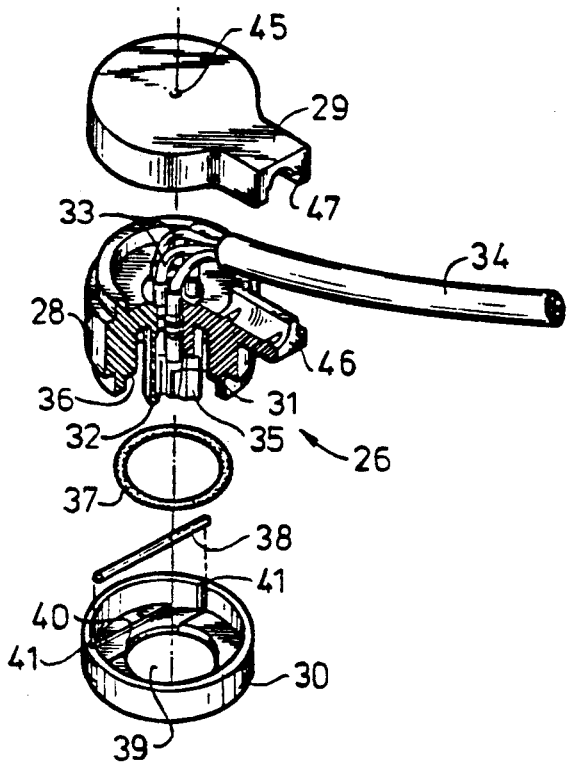
FIG. 5 shows schematically in perspective the further connector according to FIG. 4c, in exploded view.

The connector shown in FIG. 1 for fitting in a cylindrical housing, such as the cylindrical housing of a shock absorber, is indicated in its entirety by the reference number 1. The connector comprises an elongated supporting element 2, in the form of a cylindrical bar, with a first end 3 and a second end 4. A polarization lobe 5 extends outwards from the first end 3 in the lengthwise direction of the supporting element 2. Reference number 6 indicates contact elements in the form of contact pins which extend outwards in the lengthwise direction of the supporting element 2 and in the assembled state are fitted at the first end 3 in the supporting element 2. The supporting element 2 is to this end provided with holes 7, for the accommodation in a tight fit therein of one end of the contact elements 6.

An elongated flexible conductor film 8 is provided for connecting the contact elements 6 to electrical control means, such as a stepping motor or servomotor, electromagnetically operated valves and the like and if necessary one or more sensors or other electrical switching means accommodated in the cylindrical housing of a shock absorber. This conductor film 8 is provided at one end thereof with lips 9 for electrically connecting the respective conductors of the conductor film 8 to the contact elements 6. At the other end the conductor film 8 is provided with connecting lips 10, 11 for connecting the control and switching means. The length of the conductor film 8 depends on the dimensions of the cylindrical housing, in this case the position where the control and switching means are placed, which is indicated in FIG. 1 by showing the conductor film 8 interrupted. The lips 10, 11 can be of the same length or of different lengths.

For centring of the conductor film 8 relative to the supporting element 2 at the first end 3 thereof lobes 12 projecting radially outwards are provided, and situated near the second end are outward-projecting lobes 13. The flexible conductor film 8 is provided with recesses or slits 14 corresponding to the lobes 12 and with holes 15 corresponding to the lobes 13. In the fitted state of the conductor film 8 the lobes 13 lie in the recesses or slits 14, while the lobes 13 engage in the holes 15. This effectively prevents forces exerted in the lengthwise direction on the conductor film 8, for example while it is being fitted in a cylindrical housing, from being able to act on the connection of the lips 9 to the contact elements 6. The lobes 12, 13 and the matching recesses or slits 14 and the holes 15 also facilitate the connection of the conductor film 8 and the contact elements 6.

In order to retain the conductor film 8 firmly against the supporting element 2, provision is made for a retaining ring 16 which is to be fitted from the second end 4 over the supporting element 2, and which is shown partially cut away. This retaining ring, which is preferably made of plastic, is provided on its inner periphery with radially recessed slits 17 which are situated corresponding to the lobes 13 of the supporting element 2. For locking of the retaining ring 16 on the supporting element 2, it is provided with a radially inward-projecting locking lobe 18 which can engage in a locking slit 19 wich is disposed at the second end 4 of the supporting element 2 and deepened from the outer periphery in the radial direction. In order to facilitate the fitting of the retaining ring 16 on the supporting element 2, the locking lobe is made slanting at the push-on side of the retaining ring 16. For the fixing of the connector in a cylindrical housing the locking lobe 16 is also provided with recesses 20 disposed on the outer periphery.

FIG. 2 shows the conductor film 8 in elevational view. In this embodiment the film 8 is provided with five contact tracks 21, the two outermost of which end on a connecting lip 10 for connection to, for example, a stepping motor, and the three innermost contact tracks of which end on a connecting lip 11 for contacting, for example, a sensor disposed in the shock absorber, for example a pressure or temperature sensor. The film 8 is generally a plastic carrier on which the contact tracks 21 are provided by vacuum deposition or etching, and can be protected by a suitable coating. Flexible conductor films of this type are known per se in practice and are resistant to relatively high temperatures and attacks by a large number of chemical substances. In order to prevent damage to the contact tracks 21 as far as possible, the conductor film 8 with the contact tracks 21 is fitted against the supporting element 2. It will be clear that films with more or fewer contact tracks or differently arranged connecting lips can also be used.

FIG. 3 shows in detail, on an enlarged scale, the connection of the flexible conductor film 8 to the contact elements 6 and the shape of the polarization lobe 5. It can be seen clearly that this polarization lobe 5 has an approximately T-shaped cross-section, with a short leg 22 extending adjacent to the outer periphery of the supporting element 2 and a longer leg 23 lying at right angles thereto, inside the periphery of the supporting element 2. The contact elements 6 are arranged opposite the leg 23, as shown. In this arrangement the polarization lobe 5 provides an effective protection against undesirable forces on the contact elements 6 in contacting with a further connector. The polarization lobe 5 is of a sturdy construction and preferably extends further outwards than the contact elements 6 from the first end 3 of the supporting element 2. This means that when the further connector is pushed on it is already in the required contact position for contacting of the contact elements 6. In order to make the pushing on of the further connector easier, the polarization lobe 5 is bevelled at the free end of the leg 23 in the direction of the supporting element 2.

As can be seen clearly from FIG. 3, the connecting lips 9 of the conductor film 8, which are provided with holes, are aligned with the respective holes 7 in the supporting element 2 prior to fitting of the contact elements 6. The contact elements 6 are then fitted, while the contact tracks 21 of the conductor film 8 are connected electrically to the contact elements 6 by means of soldering. The so-called "reflow" soldering technique can be used for this.

FIG. 4a shows part of the assembled connector 1, before it is fitted in a cylindrical housing 24, for example the cylindrical housing of a shock absorber or a part thereof, as shown in FIG. 4b. When the connector 1 and the housing 24 are assembled, the contact elements 6 are situated near the open end 25 of the cylindrical housing 24. For contacting the contact elements 6 of the connector 1 coaxially with the housing 24, provision is made for a further connector 26, which is shown in perspective in FIG. 4c.

FIG. 5 shows the preferred embodiment of this further connector 26 in perspective and exploded view. The further connector 26 comprises a cap 27, made up of three separate elements to be connected to each other, i.e. a base part 28, a cover 29, and a sleeve 30, all made of plastic. The base part 28, which is shown partially cut away, comprises further contact elements 31 for contacting the contact elements 6 of the connector 1. In the preferred embodiments shown the contact elements 6 are formed as a pin contact and the further contact elements 31 as socket contacts. It will be clear that other contact elements which are known per se in practice and are suitable for coaxial breakable contacting can also be used. The contact elements 6 can also be designed as socket contacts and the further contact elements 31 as pin contacts.

The further contact elements 31 lie inside a cylindrical casing 32, the external diameter of which corresponds to the internal diameter of the open end 25 of the cylindrical housing 24, as shown in FIG. 4b. The respective wires 33 of an electric cable 34 are connected to the further contact elements 31, for example by soldering, or by means of a shrink connection or other suitable fastening. This electric cable can be connected to processing means placed in a vehicle, such as a microprocessor or other suitable electronic switching means, and also to supply or energizing means.

The cylindrical casing 32 is situated coaxially in the base part 28 and is provided with a T-shaped polarization slit 35 corresponding to the T-shaped polarization lobe 5 of the connector 1. The contact elements 31 are positioned, in the same way as the contact elements 6, adjoining the part of the polarization slit 35 for the accommodation of the long leg 23 of the polarization lobe 5. In order to prevent as far as possible damage to the further contact elements 31 during pushing on of the further connector 26, the cylindrical casing 32 with the polarization slit 35 preferably extends further from the base part 28 than the further contact elements 31.

From the inner periphery the base part 28 is provided with a radially deepened recess 36, for taking an O-ring 37 made of rubber or the like. The internal diameter of this O-ring 37 is selected in such a way that when the further connector 26 is fitted over the open end 25 of the housing 24 (see FIG. 4b) a liquid-tight seal is obtained. This is to prevent leakage of, for example, shock absorbing fluid from the shock absorber.

For locking of the further connector 26 on the housing 24, the latter is provided with a locking mechanism in the form of a locking bar 38, which is situated eccentrically relative to the centre of the sleeve 30, in this case eccentrically relative to the centre of the accommodation hole 39. This locking bar 38 is preferably made of metal in order to be able to withstand the forces exerted during the pushing on of the further connector 26 manually by touch or by means of a robot arm. In order to permit movement of the locking bar 38 during pushing on of the further connector, a hollow 40 is formed in the sleeve 30, in which hollow the locking bar 38, which lies with its ends in slits 41 on the inner periphery of the sleeve 30, can move.

Figure 6A:
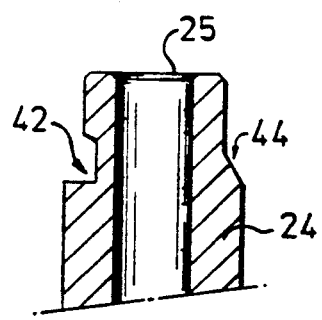
FIG. 6a shows schematically in cross-section a detail of the cylindrical housing according to FIG. 4b.
Figure 6B:
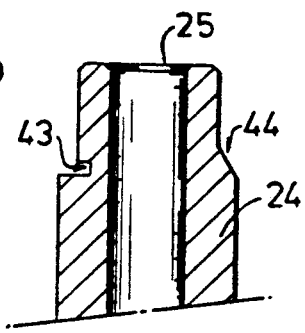

This locking bar 38 interacts with a locking slit or step 42 provided near the open end 25 of the cylindrical housing 24 on a part of the outer periphery thereof, as shown in FIGS. 4b and 6a. FIG. 6b shows a variant of the housing 24 with a different locking slit or step 43. This combination of a locking bar 38 and locking slit or step 42, 43 provides a reliable locking mechanism which is very resistant to vibrations, shocks or impacts. In order to facilitate contacting and disconnecting of the connectors 1, 26, the cylindrical housing 24 is provided on the outer periphery, opposite the locking bar or step 42, 43, with a part 44 running slanting in the push-on direction (see FIG. 4a).

The individual parts 28, 29, 30 of the cap 27 of the further connector 26 shown in FIG. 5 are preferably connected to each other by ultrasonic welding. In order to obtain a moisture-proof, sturdy construction, the empty spaces in the cap 27 are filled up with an epoxy resin. For this, an aperture 45 is provided in the cover 29. The base part 28 and the cover 29 are also provided with an interacting cable duct 46 and 47 respectively for supporting and clamping the electric cable 34 in a strain-relieved manner.

Figure 7:
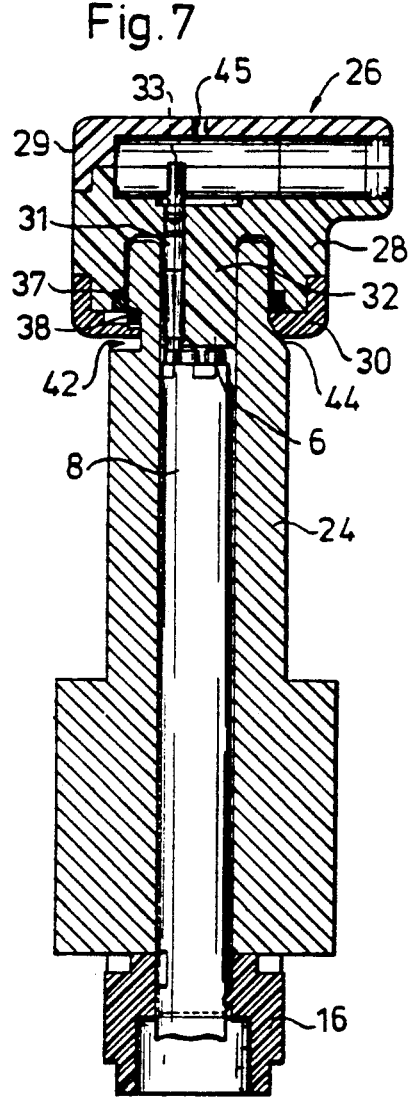
FIG. 7 shows partially in longitudinal section and elevational view schematically the assembled connector assembly according to FIGS. 4a, 4b and 4c.

FIG. 7 shows, finally, a partial cross-section in the lengthwise direction of the assembled connector according to FIG. 4, viewed from the line VII—VII in FIG. 4b.

In addition to the function of retaining and locking the flexible conductor film 8 against the supporting element 2, the retaining ring 16 also serves as a stop for placing of the connector 1 in the cylindrical housing 24. It must be understood that the cylindrical housing 24 in itself can form part of a larger unit, such as a housing of a shock absorber or the shock absorber housing itself. This is shown only schematically in the figures, without further attention being paid to the way in which the housing 24 shown in FIG. 4b or FIG. 7 must be fixed.

Although the invention is illustrated with reference to an example of an embodiment, many modifications and additions are possible for an expert without deviating from the inventive idea on which the invention is based. These modifications and additions can, for example, relate to the design of the polarization lobe 5, replacement of the flexible conductor film 8 by electrically insulated wires, or the way in which the supporting element 2 of the connector is fitted in a cylindrical housing. Nor is the application field of the connector system according to the invention limited to shock absorbers, but the same advantage is also applicable in the case of similar devices in which a liquid-tight connector connection at difficultly accessible or poorly visible places is required.

I claim:

1. A connector, in particular for use in an electrically adjustable shock absorber of the type comprising a cylindrical housing in which shock-absorbing means and electrical control means are accommodated, said connector comprising a supporting element of electrically insulating material to be accommodated in the cylindrical housing and having a first and second end, contact elements and positioning means for connecting a further connector being situated at said first end, and electrical conductors connected to the respective contact elements extending from said first end past said second end for connecting the electrical control means, wherein the positioning means comprising a polarization lobe projecting outwards past said first end in the lengthwise direction of the supporting element, for contacting the contact elements of the connector with the further connector in a specific position, said polarization lobe being situated inside the periphery of the supporting element and having an approximately T-shaped cross-section, one leg of which adjoins the periphery of the supporting element.

2. A connector according to claim 1, wherein the contact elements are placed inside the periphery of the supporting element opposite another leg of the polarization lobe.

3. A connector according to claim 1, wherein the polarization lobe projects further outwards past said first end in the lengthwise direction of the supporting element than the contact elements.

4. A connector according to claim 1, wherein the supporting element is elongated in shape and the electrical conductors are electrically conducting contact tracks on a flexible film extending along the periphery of the supporting element.

5. A connector according to claim 4, wherein the supporting element near said first and second end is provided with lobes projecting radially outwards, while the film is provided with openings corresponding to these lobes for centring the film relative to the supporting element.

6. A connector according to claim 5, comprising a retaining ring which is to be fitted from said second end over the supporting element for holding the film against the supporting element, which retaining ring has slits lying on the inner periphery and opening onto a boundary face, for the accommodation of the lobes positioned near said second end, and being provided with at least one locking lobe projecting in the radial direction from the inner periphery, while the supporting element at said second end has at least one corresponding locking slit for the accommodation of the locking lobe.

7. A connector according to claim 1, wherein the supporting element is accommodated in an open cylindrical housing and lies with its first end near an open end of the housing, for contacting the contact elements of the connector with the further connector.

8. A further connector for use with the connector according to claim 7, comprising a cap of electrically insulating material provided with further contact elements and an accommodation hole for contacting the contact elements of the connector coaxially with the cylindrical housing from the open end thereof, which further connector is provided with a polarization slit having an approximately T-shaped cross-section for receiving the polarization lobe, and with locking means for locking the further connector on the cylindrical housing in the contacted position.

9. A further connector according to claim 8, wherein the further contact elements are situated opposite the part of the polarization slit corresponding to another leg of the polarization lobe.

10. A further connector according to claim 8, wherein the cap is provided with sealing means, for fitting of the further connector in a liquid-tight manner over the open end of the cylindrical housing.

11. A further connector according to claim 10, wherein the sealing means are in the form of an O-ring fitted in the cap for engaging on the outer periphery of the cylindrical housing.

12. A further connector according to claim 8, wherein the locking means comprise a bar which lies eccentrically relative to the centre over the accommodation hole of the cap, for engagement in a locking slit or step provided on the outer periphery of the cylindrical housing, near the open end thereof.

13. A further connector according to claim 12, wherein the bar is made of metal.

14. A further connector according to claim 12, wherein the cap is made up of a separate base part, for supporting the further contact elements, the electrical conductors to be connected thereto and the sealing means, a cover sealing the contact elements and the electrical conductors at one side of the base part and a sleeve fitted at the another side of the base part for supporting the locking bar, the base part, the cover and the sleeve being made of plastic and being connected to each other in a liquid-tight manner preferably by means of ultrasonic welding.

* * * * *